United States Patent [19]

Maxwell

[11] 3,712,783
[45] Jan. 23, 1973

[54] FEED SYSTEM
[75] Inventor: Bryce Maxwell, Princeton, N.J.
[73] Assignee: USM Corporation, Boston, Mass.
[22] Filed: Sept. 25, 1970
[21] Appl. No.: 75,544

[52] U.S. Cl. .............................................. 425/381.2
[51] Int. Cl. .............................................. B29d 23/04
[58] Field of Search ..................... 18/12 C; 425/381.2

[56] References Cited

UNITED STATES PATENTS

| | | | |
|---|---|---|---|
| 3,046,603 | 12/1958 | Maxwell | 18/12 C X |
| 3,176,965 | 4/1965 | Schrenk et al. | 18/12 C UX |
| 2,977,632 | 4/1961 | Bunch | 18/12 C X |
| 3,079,635 | 3/1963 | Adams | 18/12 C X |

Primary Examiner—H. A. Kilby, Jr.
Attorney—Kenyon & Kenyon Reilly Carr & Chapin

[57] ABSTRACT

An elastic melt extruder for processing visco-elastic plastic material is provided with a peripheral inlet leading into a diverging feed zone in the processing gap formed between the rotor and stator walls. As the plastic particles are sheared, tumbled and heated in the diverging feed region, they grow in size, as by forming balls of partially compacted material. The expanded particles or balls are then centripetally pumped into a restriction zone where the relative motion of the rotor and stator tend to compact, shear and smear the particles into an homogeneous mass which is centripetally pumped and caused to be extruded through an outlet centrally located in the rotor or stator. Also included is a dual-rotor design which permits higher shear rates in the central region near the rotor axis, and consequently, greater flow rates, and a special dual-rotor design which permits separate initial mixing of disparate visco-elastic materials.

5 Claims, 2 Drawing Figures

INVENTOR.
BRYCE MAXWELL

FEED SYSTEM

BACKGROUND OF THE INVENTION

1. Field of the Invention

The present invention relates to the extrusion of visco-elastic materials, and more particularly to a method and apparatus for improving both the flow of the material and the centripetal pumping action of the extruder, and also the separate initial mixing of materials.

2. Description of the Prior Art

The extrusion of materials includes the mixing, compounding and transporting of materials, as well as the changing of the conditions or state of materials by the addition of heat and pressure. A type of mixing extruder, commonly known as the "elastic melt extruder," is described in the "Modern Plastics Magazine" issue of Oct. 1959, in an article by Bryce Maxwell and Anthony J. Scalora, and in U.S. Pat. No. 3,046,603 issued to Bryce Maxwell on July 31, 1962. The elastic melt extruder utilizes "the normal force effect" based on the principal that when a visco-elastic material is sheared between a rotating surface and a relatively stationary surface, a centripetal force is developed which causes the material being processed to be extruded through an outlet centrally located in one of the two members.

More particularly, in the general method of extrusion, plastic pellets or other materials of a similar nature are fed through a hopper to a cup-shaped container, sometimes referred to as a stator. Heating elements can be employed to assist in melting the pellets into a liquid mass. A cylindrical rotor is rotatably mounted in the container with its bottom face spaced apart from the bottom wall of the container to provide a processing gap through which the liquid flows. Also, a discharge opening is provided in the bottom of the container near the axis of rotation of the rotor. Rotation of the rotor relative to the container causes the liquid in this gap to become sheared. As the rotational speed is increased, the shearing stress is increased, and a force normal to this stress is developed between the bottom face of the rotor and the bottom wall of the container, the force of this centripetal pumping action on the visco-elastic material effects the extrusion. Also, the rotor is anchored against axial displacement so that this normal force will be effectively used in the pumping and extrusion of the material out of the discharge opening through an extrusion die.

When a raw visco-elastic material to be processed enters into the feed zone located in the processing gap near its periphery, such material will be sheared and heated causing it to expand. The visco-elastic material particles form balls of particulate compacted material and as they grow in size, there is a tendancy of the materials, in conventional extruder apparatus, to produce a back flow in the direction out of the feed zone. This back flow is undesirable as it acts to inhibit the free flow of raw materials into and through the feed zone.

Also, in conventional extruder apparatus, the shear rate of the material being processed is proportional to the radial distance from the axis of rotation and is therefore a minimum at the axis. Consequently, the shear rate produced in the central zone near the axis of the extruder machine is substantially less than the shear rate produced further radially out towards the periphery of the processing gap. While it is desirable to increase the shear rate in this central zone and consequently increase the pumping rate, this is limited by the rotor speed which must be kept below the level which might produce undesirable effects at points in the gap further out from the axis.

It is to be understood that as used herein, the term "diverging feed zone" is intended to mean that portion of the processing gap which is formed between the walls of a rotor and a stator (or another rotor having relative motion to the aforesaid rotor) and extends annularly around the axis of rotation. Such walls diverge from each other in the "diverging feed zone" in the gap direction approaching the axis, and likewise, the longitudinal distance across the gap increases. It is to be further understood that as used herein, the term "restriction zone" is intended to mean that portion of the processing gap which is formed between the walls of a rotor and stator (or another relative moving rotor). The walls defining the "restriction zone" converge toward one another in the direction toward the axis.

SUMMARY OF THE INVENTION

It is an object of the invention to provide an elastic melt extruder having improved flow characteristics of the material in the feed zone.

It is another object to provide an elastic melt extruder which prevents back flow of the material out of the feed zone.

It is another object to provide an elastic melt extruder which permits high shear rates in the central zone near the axis of rotation.

It is a further object to provide an elastic melt extruder in which both the shear rate and the rate of flow of material are adjustable in various zones along the processing gap.

These and other objects, which become apparent from the detailed disclosure and claims to follow, are achieved by the present invention which provides a method for processing visco-elastic materials in an elastic melt extruder, comprising feeding a visco-elastic material into a peripheral inlet leading into a diverging feed zone in the processing gap formed between the rotor and stator surfaces of the extruder, confining the visco-elastic material particles in such diverging feed zone as they grow in size, as by forming balls of material, compacting such expanded particles into a substantially homogeneous mass in a restriction zone, and centripetally pumping such homogeneous mass towards the axis of rotation of the rotor where it is caused to be extruded through an outlet.

Also, the present invention provides, in an embodiment, an apparatus by which the diverging feed zone may, at its inner end portion, be gradually displaced axially as well as radially inward, and the restriction zone is generally displaced at a lesser angle to the axis than the initial and major portion of the diverging feed zone. In this restriction zone the material particles that have grown in size are trapped, and the relative motion between the rotor and stator tend to smear out the particles and to compact them.

Also, the present invention provides an apparatus for extruding a visco-elastic material comprising rotor and stator members spaced apart from and facing each other in close proximity to define a processing gap therebetween, the opposing walls of such rotor and stator members being, for example, essentially surfaces of revolution, and means for rotating at least one rotor so as to shear the visco-elastic material and produce a centripetal pumping action of the material. An inlet is located near the periphery of the processing gap, and a diverging feed zone receives the material from the inlet zone and enhances the centripetal flow of material while confining the material particles as they are sheared and heated and grow in size. Directly downstream of the diverging feed zone is a restriction zone where the relative motion of the rotor and stator tend to compact such expanded material particles into an homogeneous mass which is further pumped centripetally in a central zone and thereafter caused to be extruded through an outlet centrally located in the rotor or stator. Other embodiments include a dual-rotor design which permits higher shear rates in the central zone, and an adjustable gap design for varying both the shear and flow rates.

DESCRIPTION OF THE PREFERRED EMBODIMENTS

Figure 1:
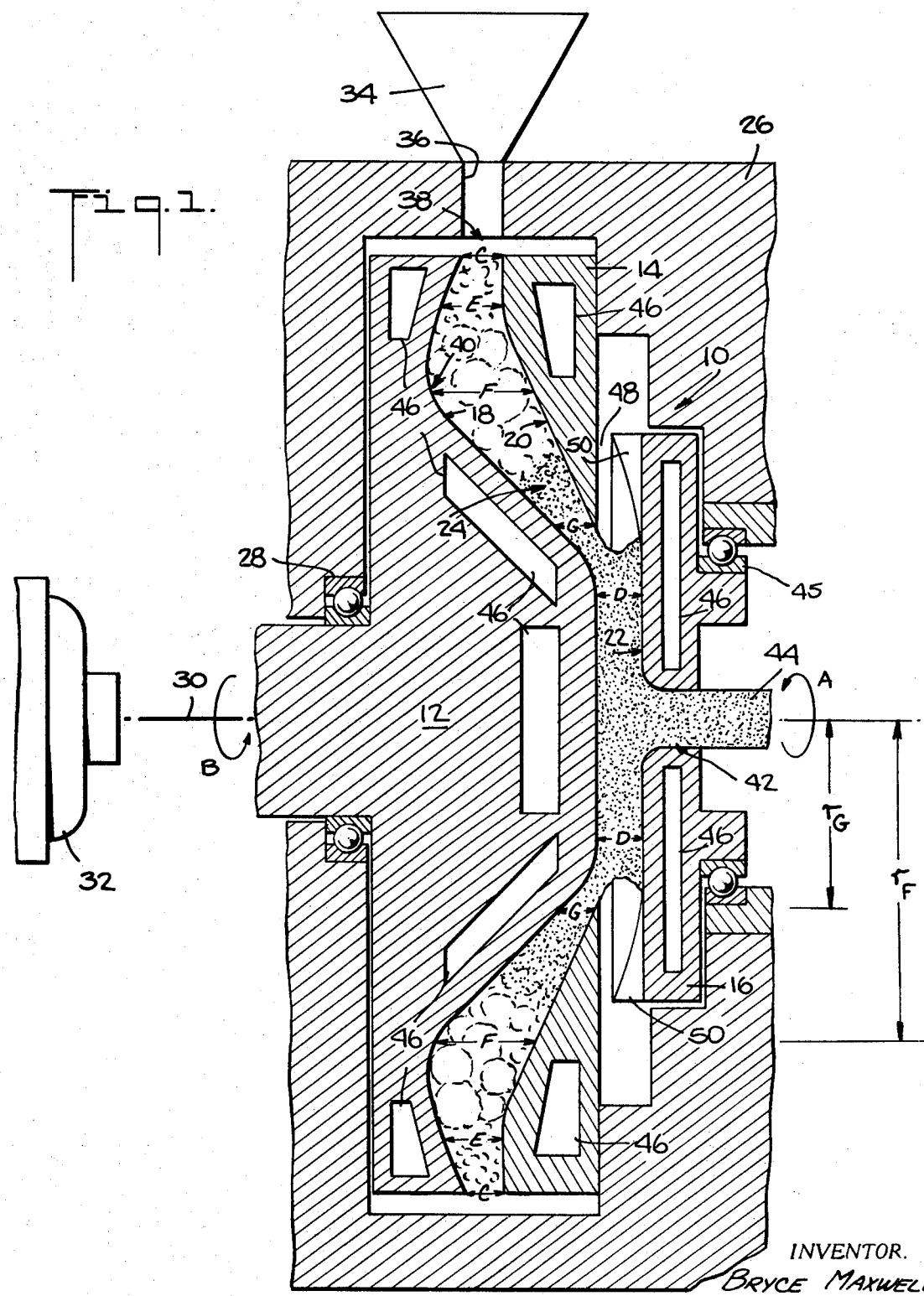
FIG. 1 is a vertical cross-sectional view of the elastic melt extruder, illustrative of the invention.

Referring to the drawings, there is shown in FIG. 1 an elastic melt extruder 10 illustrative of the invention. Extruder 10 comprises two members 12 and 14 providing relative rotative motion therebetween, such as a rotor 12 and a stator 14. For purposes of this portion of the description, member 16 is to be considered as a part of the stator 14 and fixed relative to such stator 14, so that the rotor 12 is in motion relative to the two fixed stator members 14 and 16. However, as will be discussed in greater detail hereinafter, member 16 can be designed as a part completely separate from stator 14 and operated as a second rotor. Rotor 12 and stator 14, 16 provide working surfaces 18, 20 and 22, respectively, spaced apart from each other and facing each other in close proximity so as to provide a processing gap 24 between surface 18 and surfaces 20 and 22. Stator 14, 16 is fixedly attached to a stationary member 26 while rotor 12 rotates on bearings 28 about an axis of rotation 30 as it is driven by a motor 32. The visco-elastic material for processing is fed via a feed means, such as a material supply hopper 34 through an opening 36, in the stationary member 26, into a peripheral inlet 38. Inlet 38 extends around the outer periphery of the processing gap 24 and leads directly into a diverging feed zone as indicated by the letters C, E and F in the gap 24. Zone C E F starts from cross-section C and extends through cross-section E to cross-section F. Thus, as the visco-elastic material progresses centripetally after passing through the inlet 38, the gap longitudinal spacing increases between the rotor 12 and the stator 14 as shown by the cross-sections indicated at C, E and F.

As the material particles are heated and centripetally moved in the diverging feed zone C E F, the relatively moving walls of the diverging feed zone C E F confine the material particles and cause them to form balls of particulate compacted material and to grow in size. Furthermore, as expansion of the particles occurs, and the material is in effect rolled up into large balls, the diverging gap C E F acts to squeeze such growing balls downstream as they are centripetally pumped in a manner which improves the feeding action. The diverging gap C E F also helps to prevent a back flow out of the feed zone C E F towards the inlet 38, which back flow might otherwise occur in the absence of such feed zone C E F and inhibit the free flow of raw materials through the inlet 38.

The diverging feed zone C E F extends along the gap 24 from point C to point E to the widest gap portion at point F, beyond which point F the walls 18 and 20 of the rotor 12 and the stator 14 begin to form the gap 24 at an oblique angle with respect to the axis of rotation 30. As the balls of feed material move in the direction around the corner 40 formed by rotor wall 18, the flow of material is at an oblique angle to the axis of rotation 30 and enters a restriction zone, as indicated by the letters F and G, which zone F G begins at point F and ends at point G. As a result, the balls of feed material become trapped as they pass through this restriction zone F G where the relative motion of the rotor 12 and stator 14 act to shear and smear out the balls of feed material so that they become compacted to form a substantially homogeneous mass which is centripetally pumped by the elastic melt effect.

It is noted that the design of the extruder 10 with a restriction zone F G forming the gap 24 at an oblique angle is effective to produce a greater smearing action on the clumps or balls of feed material without using up rotor radius. That is, the use of an oblique angle provides a greater smearing action without requiring an extruder machine with a larger radius, for any given throughput capacity.

After passing the restriction zone F G the visco-elastic material is further pumped centripetally in a central zone D formed between the rotor wall 18 and the wall 22 of stator 16, and thereby caused to be extruded through an outlet passage 42 in stator 16 as the processed product 44.

The extruder 10 is also provided with means, not shown, for heating and cooling the rotor 12 and stator 14, 16 through a plurality of passages 46. Any suitable heating and cooling means may be employed for these purposes. Also, it is to be understood that any suitable means for driving the rotor 12 and for feeding the raw material into the inlet 38 other than the means shown and described with reference to FIG. 1 can be employed in carrying out the invention.

The diverging feed zone C E F and the restriction zone F G are designed with a specific relationship to each other to provide the optimum or most desirable operation of the extruder 10. More specifically, there most desirably exist certain specific gap distance and area ratios at various points along the gap as follows:

a. Where C represents the longitudinal distance (which is parallel to the axis of rotation 30) across the gap at the outermost point in the gap;

b. F represents the longitudinal distance across the gap at the widest point 40 of the divergent feed zone C E F, where the rotor wall 18 curves to form an oblique angle with respect to axis of rotation 30;

c. G represents the longitudinal distance across the gap in the restriction zone F G at the point G where the gap distance is the narrowest;

d. $r_F$ represents the radial distance to the point where F is located; and e. $r_G$ represents the radial distance to the point where G is located.

Then it has been found especially desirable if the embodiment is constructed so that the following relationships exist:

1. Distance F is larger than distance C; and
2. $2\pi \times r_G \times G$ is less than $2\pi \times r_F \times F$.

In conventional constructions, it has been found that the shear rate of the material is generally proportional to the radial distance between the material and the axis of rotation since the rotor surface at points further out from the axis moves at a faster rate than at those points closer to the axis. This results, for example, in a relatively lower shear rate being produced in the central zone D near the axis 30, while relatively higher shear rates exist further out in the diverging feed zone C E F. In conventional construction, in order to substantially increase the shear rate in the central zone D, the rotor speed must ordinarily be increased proportionately. This increased rotor speed will, however, produce an undesirable effect in the areas further out from the axis 30, such as in the feed zone C E F.

Applicant has found that this problem may be overcome if the member 16 is connected to operate as a rotor which rotates in a direction opposite to the direction of rotor 12, as indicated by the arrows A and B, respectively, in FIG. 1. In this fashion, the material being processed in the central zone D is sheared at a rate which is greater than the rate otherwise obtainable if member 16 were a stator, and these higher shear rates are produced in the central zone D while at the same time maintaining the desirable shear rates in the feed zone C E F. In addition, the higher rate of shear produced in the central zone D is effective to produce a pumping action which assists the pumping away or removal of the material passing through the restriction zone F G. It is noted that the optimum setting of this gap distance D is a function of the rotor diameter of the extruder machine.

As an additional method for adjusting the shear rates at various points along the processing gap 24, as well as the rate of flow of material, the gap distance G and the gap distance D can be made independently variable by adjusting the spacing between rotor 12 and stator 14, and between rotor 12 and rotor 16. The gap at point G can be varied by moving the support bearing 28 with respect to the stator 14, in order to control the restriction of flow in the restriction zone F G. Also, the gap at point D can be independently varied by moving the support bearing 45 with respect to rotor 12, in order to control both the shear rate and the flow of material in the central zone D.

The extruder 10 may be provided with a passage 48 permitting access to the gap 24 for purposes of removing volatile materials from the visco-elastic plastic material being processed. In this connection, protruding member 50 may be provided by a member 50 which extends longitudinally from the rotor 16 so as to prevent any material, which might come off of the main mass of material in the gap, from escaping through the passage 48.

Figure 2:
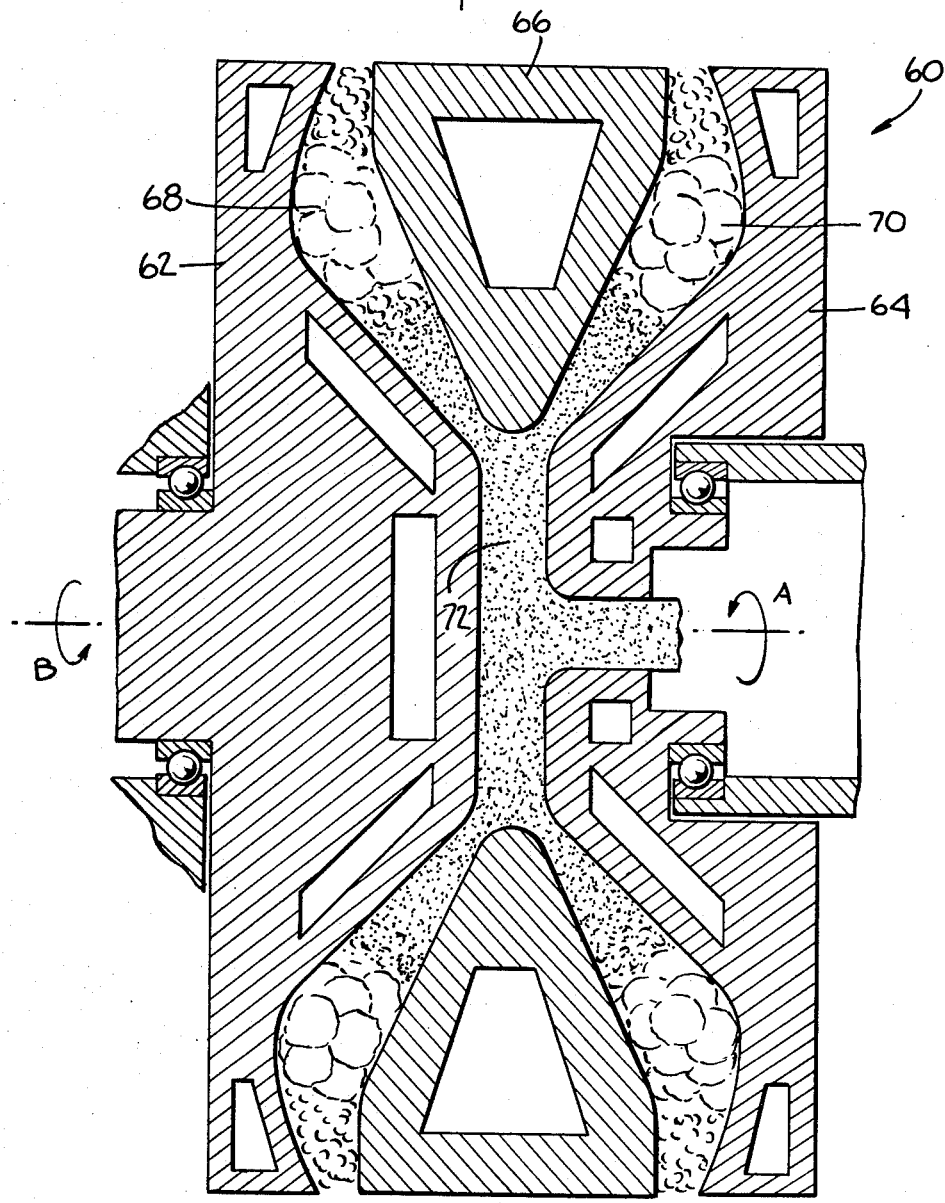
FIG. 2 is a vertical cross-sectional view of a modification of the elastic melt extruder adapted for mixing two separate melts and incorporating a rotor-stator-rotor design.

There presently exist some visco-elastic plastic materials that cannot be mixed together until they have been compacted and heat plasticized. Also, it is undesirable to mix some visco-elastic plastic materials together until they have been processed to some degree. Referring to FIG. 2, there is shown a modification of the extruder described in reference to FIG. 1. Here, an extruder 60 is shown having parts which function in the same manner as the members shown and described in FIG. 1, with the exception that the extruder 60 is designed to accommodate mixing of two melts.

Specifically, two rotors 62 and 64 are spaced apart from a stator 66 in a manner which forms two separate processing gaps 68 and 70, respectively. Gaps 68 and 70 converge at a point downstream and meet in a common central zone 72. In this fashion, the two separate gaps 68 and 70 enable two visco-elastic materials to be processed to some degree before they are mixed together. One feature of the extruder 60 is the provision of high shear rates in the central zone 72. This is permitted by the oppositely rotating rotors 62 and 64 which produce a high relative motion of the surfaces of rotors 72 and 74 in the central zone 72 where the two visco-elastic plastic materials are being mixed together without requiring as high a shear rate in the regions of high radial distance from the axis of rotation 30, such as in the diverging feed zones. Other parts of the extruder 60 are substantially identical to the parts in extruder 10 and therefore are not described in regard to this embodiment.

While the specific embodiments of the invention have been shown and described in detail to illustrate the application of the invention principles, it is to be understood that the invention may be embodied otherwise without departing from such principles in light of the teaching herein.

What is claimed is:

1. Apparatus for extruding a visco-elastic material from two separate melts, comprising:

two rotor members spaced apart from and facing each other and positioned in close proximity in an area near the axis of rotation of said rotors to define a central zone of a processing gap;

a stator member interposed between the opposing walls of said rotors in an area radially outward of said central zone of said processing gap so that the opposite stator walls face each of the two rotor walls in close proximity to define two separate processing gaps which converge radially inward and meet in said central zone; rotors and stator being basically surfaces of revolution;

means for rotating said rotors relative to said stator to shear the visco-elastic material and produce a centripetal pumping action of said material;

two inlets, one located near the periphery of each processing gap; and a common outlet centrally located in one of said rotors.

2. Apparatus as recited in claim 1, wherein each of the two processing gaps includes a diverging feed zone located to receive the raw material from its respective inlet, and a restriction zone located to receive the material from its respective diverging feed zone and in which the relative motion of the rotor and stator compacts such material into an homogeneous mass, said restriction zones converging to said central zone where the mass of material is pumped centripetally and caused to be extruded through the outlet centrally located in one of said rotors.

3. Apparatus as recited in claim 1, wherein the two rotor members are adapted to rotate in opposite directions relative to one another.

4. Apparatus for extruding a visco-elastic material, comprising:
   rotor and stator means spaced apart from and facing each other in close proximity to define a processing gap therebetween;
   means for rotating said rotor means relative to said stator means to shear visco-elastic material disposed therebetween and to produce a centripetal pumping action of said material;
   an inlet near the periphery of said processing gap;
   a diverging feed zone located in said processing gap to receive the material from said inlet, said diverging feed zone being formed by a portion of the rotor and stator walls which diverge from each other in a gap direction toward the axis of rotation, said diverging feed zone extending substantially in a plane which is perpendicular to the axis of rotation of the rotor;
   a restriction zone located in said processing gap to receive the material from said diverging feed zone, and in which the relative motion of the rotor and stator tend to compact such material into a homogeneous mass, said restriction zone being formed by a portion of the rotor and stator walls which converge toward each other in the gap direction toward the axis of rotation, and said walls defining said diverging feed zone continuing into said walls defining said restriction zone, and said restriction zone extending at a substantially oblique angle with respect to said axis of rotation; and
   a central zone located downstream of said restriction zone where the mass of material is pumped centripetally and caused to be extruded through an outlet.

5. Apparatus for extruding a visco-elastic material, comprising:
   rotor and stator means spaced apart from and facing each other in close proximity to define a processing gap therebetween;
   means for rotating said rotor means relative to said stator means to shear visco-elastic material disposed therebetween and to produce a centripetal pumping action of said material;
   an inlet near the periphery of said processing gap;
   a diverging feed zone located in said processing gap to receive the material from said inlet, said diverging feed zone being formed by a portion of the rotor and stator walls which diverge from each other in a gap direction toward the axis of rotation;
   a restriction zone located in said processing gap to receive the material from said diverging feed zone, and in which the relative motion of the rotor and stator tend to compact such material into a homogeneous mass, said restriction zone being formed by a portion of the rotor and stator walls which converge toward each other in the gap direction toward the axis of rotation, and said walls defining said diverging feed zone continuing into said walls defining said restriction zone;
   a central zone located downstream of said restriction zone where the mass of material is pumped centripetally and caused to be extruded through an outlet;
   said rotor means including two rotors spaced apart and facing each other in close proximity to define said central zone of the processing gap, and said rotors are adapted to rotate in opposite directions relative to one another to shear and centripetally pump the material from said restriction zone through said central zone and out of said extruder outlet; and
   said stator means including a stator member spaced apart from and facing one of said rotors in close proximity to define said diverging feed zone and said restriction zone of the processing gap.

* * * * *